(12) United States Patent
Olson et al.

(10) Patent No.: US 11,009,116 B2
(45) Date of Patent: May 18, 2021

(54) PASSIVE OIL SYSTEM FOR PLANETARY BEARINGS

(71) Applicant: Bell Helicopter Textron Inc., Fort Worth, TX (US)

(72) Inventors: Eric Stephen Olson, Fort Worth, TX (US); David Bockmiller, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 451 days.

(21) Appl. No.: 15/961,370

(22) Filed: Apr. 24, 2018

(65) Prior Publication Data

US 2019/0323596 A1    Oct. 24, 2019

(51) Int. Cl.
*F16H 57/04*    (2010.01)

(52) U.S. Cl.
CPC ....... *F16H 57/0427* (2013.01); *F16H 57/045* (2013.01); *F16H 57/0482* (2013.01)

(58) Field of Classification Search
CPC . F16H 57/0427; F16H 57/045; F16H 57/0482
See application file for complete search history.

(56) References Cited

U.S. PATENT DOCUMENTS

| | | | | |
|---|---|---|---|---|
| 5,094,039 | A * | 3/1992 | Yoshioka | B23F 21/03 451/450 |
| 5,119,905 | A * | 6/1992 | Murray | F01D 25/18 184/6.11 |
| 5,622,239 | A * | 4/1997 | Orlitzky | F16H 57/0463 184/39 |
| 9,683,652 | B2 * | 6/2017 | Poster | F16H 57/0495 |
| 9,765,875 | B2 * | 9/2017 | Sheridan | F16H 57/0482 |
| 10,697,586 | B2 * | 6/2020 | Poster | F16C 33/6659 |
| 2006/0053922 | A1 * | 3/2006 | Laabs | F16H 57/0431 74/467 |
| 2009/0078075 | A1 * | 3/2009 | Vassaux | F16H 57/0431 74/468 |
| 2012/0227820 | A1 * | 9/2012 | Poster | F16H 57/0416 137/1 |
| 2012/0247874 | A1 * | 10/2012 | Poster | F16H 57/0438 184/6.12 |
| 2017/0089449 | A1 * | 3/2017 | Olson | F16H 57/0426 |
| 2017/0284535 | A1 * | 10/2017 | Ehinger | B64C 27/06 |
| 2018/0258794 | A1 * | 9/2018 | Gedin | F16H 57/0479 |
| 2019/0085972 | A1 * | 3/2019 | Uhkoetter | F02C 7/36 |
| 2019/0219149 | A1 * | 7/2019 | Olson | F16H 57/0441 |
| 2019/0323596 | A1 * | 10/2019 | Olson | F16H 57/045 |

FOREIGN PATENT DOCUMENTS

| | | |
|---|---|---|
| EP | 2505878 A1 | 10/2012 |
| EP | 2690318 A1 | 1/2014 |

* cited by examiner

*Primary Examiner* — Michael A Riegelman
(74) *Attorney, Agent, or Firm* — Shackelford, Bowen, McKinley & Norton, LLP (57) ABSTRACT

An exemplary passive oil system includes a reservoir housing configured in operation to rotate around a rotational axis, the reservoir housing defining a reservoir between a top wall, a bottom wall, innermost side, and an outer sidewall; and an outlet positioned adjacent the outer sidewall to discharge a lubrication fluid contained in the reservoir in response to the reservoir housing rotating around the rotational axis.

10 Claims, 12 Drawing Sheets

PASSIVE OIL SYSTEM FOR PLANETARY BEARINGS

BACKGROUND

This section provides background information to facilitate a better understanding of the various aspects of the disclosure. It should be understood that the statements in this section of this document are to be read in this light, and not as admissions of prior art.

Fluid systems are well known in the art for providing fluid to working elements such as aircraft ailerons, gearboxes, bearings, tractor arms, and other similar devices. There exists a wide variety of fluid systems, including lubrication systems configured for effectively reducing heat and wear created between intermeshing parts. Fluid systems share a common feature, namely, fluid systems typically include a reservoir for storing a fluid, a drive subsystem for providing pressure to the fluid, and a plurality of conduits for channeling the fluid from the reservoir to a working element.

Some fluid systems are subject to extensive wear and exposed to hostile environments. For example, components for a tractor-arm hydraulic system could easily be damaged by the harsh environment associated therewith. In some fluid systems, damage to system's components could lead to catastrophic results. For example, a lubrication system in fluid communication with an aircraft gearbox could malfunction while the aircraft is in flight, resulting in the gearbox losing torque and the aircraft becoming inoperable.

Although the foregoing developments represent great strides in the area of fluid systems, many shortcomings remain.

SUMMARY

An exemplary passive oil system includes a reservoir housing configured in operation to rotate around a rotational axis, the reservoir housing defining a reservoir between a top wall, a bottom wall, innermost side, and an outer sidewall; and an outlet positioned adjacent the outer sidewall to discharge a lubrication fluid contained in the reservoir in response to the reservoir housing rotating around the rotational axis.

An exemplary gearbox includes a reservoir housing configured in operation to rotate around a rotational axis, the reservoir housing defining a reservoir between a top wall, a bottom wall, innermost side, and an outer sidewall; and an outlet positioned adjacent the outer sidewall to discharge a lubrication fluid contained in the reservoir to a gearbox component in response to rotation of the reservoir housing around the rotational axis.

An exemplary method of lubrication includes rotating a reservoir housing around a rotational axis, the reservoir housing defining a reservoir between a top wall, a bottom wall, innermost side, and an outer sidewall; supplying, in normal operation, a lubrication fluid from a lubrication supply line to the reservoir; and discharging the lubrication fluid from the reservoir through an outlet positioned adjacent the outer sidewall to a gearbox component.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with benefit of this disclosure, elements and arrangements of the various figures can be used together and in configurations not specifically illustrated without departing from the scope of this disclosure.

DETAILED DESCRIPTION

It is to be understood that the following disclosure provides different illustrative embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

With reference to all of the figures, a passive oil system, generally denoted by the numeral 10, is disclosed for continued lubrication during an emergency loss of lubrication event. The passive oil system 10 is a centrifugal force (CF) system that is configured for use with any number of working elements such as components for turbines, cars, tractors, trucks, aircraft and other devices. The passive oil system is particularly adapted for use in a tiltrotor aircraft where the passive oil system provides lubrication whether the aircraft is in a helicopter mode or an airplane mode.

Figure 1:
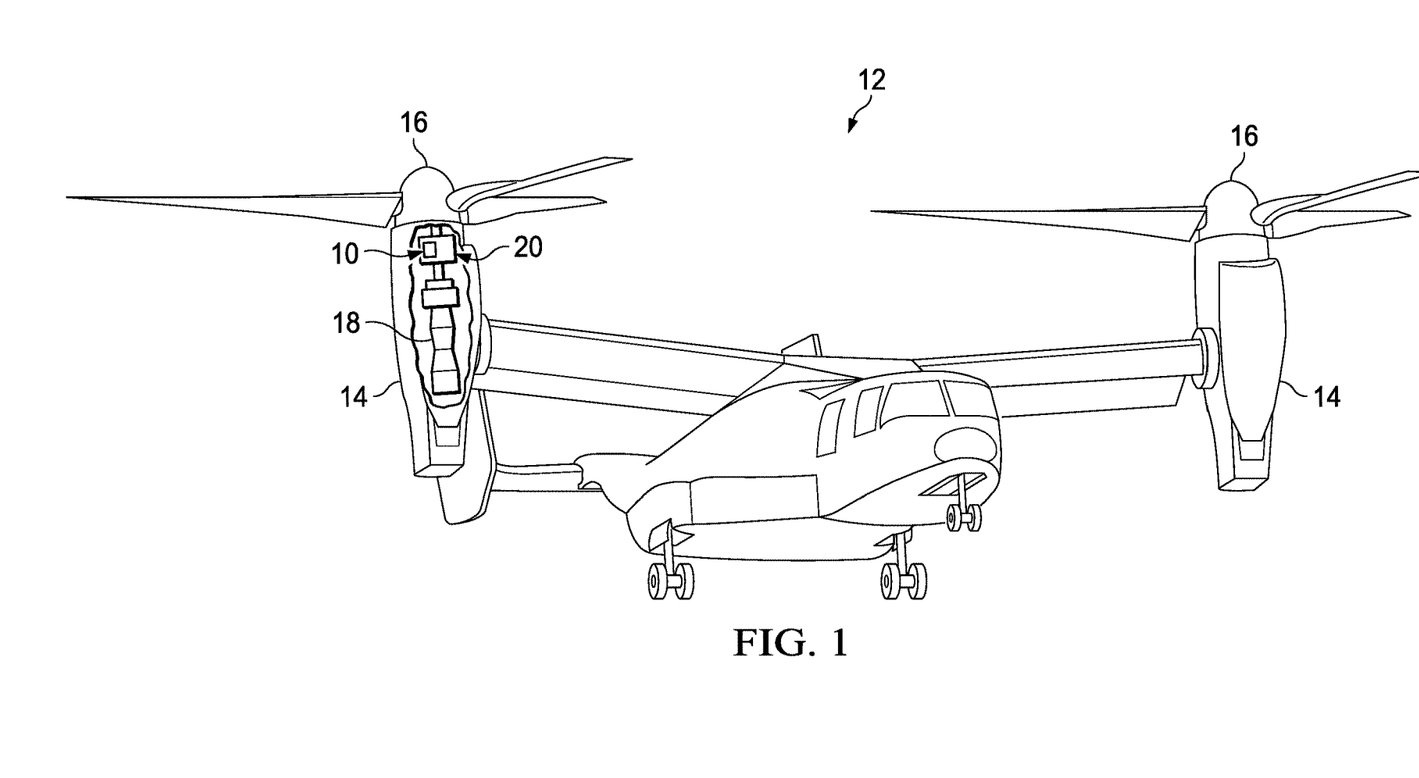
FIG. 1 is an illustrative example of an aircraft in which a passive oil system for planetary bearings may be implemented.

In an exemplary embodiment, the passive oil system is configured for use with an aircraft rotor gearbox. FIG. 1 illustrates an exemplary tiltrotor aircraft 12 operable in a helicopter mode and an aircraft mode. Tiltrotor aircraft 12 includes two nacelles 14 each carrying a rotor hub 16. A cutout view of one of the nacelles illustrates an engine 18 coupled to a gearbox 20. A passive oil system 10 is incorporated in the gearbox 20.

The passive oil system 10 disclosed herein is directed to an emergency system for providing lubrication in a loss of lubrication event. Aircraft regulatory agencies, such as the Federal Aviation Administration (FAA) may require that aircraft gearboxes, such as gearbox 20, be operable for a requisite period of time after the primary lubrication system has failed. Such a requirement in aircraft gearboxes may be referred to as a "run dry" capability requirement. Therefore, aircraft can be required to maintain manageable flight operations for selected durations of time if the primary lubrication system fails (low pressure). The primary lubrication system can refer to the lubrication system or systems associated with gearbox 20 of the aircraft. The passive oil system 10 can be configured to maintain manageable flight operations of the aircraft for a selected duration in accordance with the "run dry" capability requirement. For example, the passive oil system 10 can be configured to prevent failure of the gearbox 20 due to heat build-up for a specified time-period (possibly thirty minutes) after failure of the primary lubrication system. It is understood the time-period may be lengthened or shortened. Manageable flight operations can refer to a degree of control a pilot has over the flight controls and drive train of an aircraft to safely land the aircraft.

Figure 2:
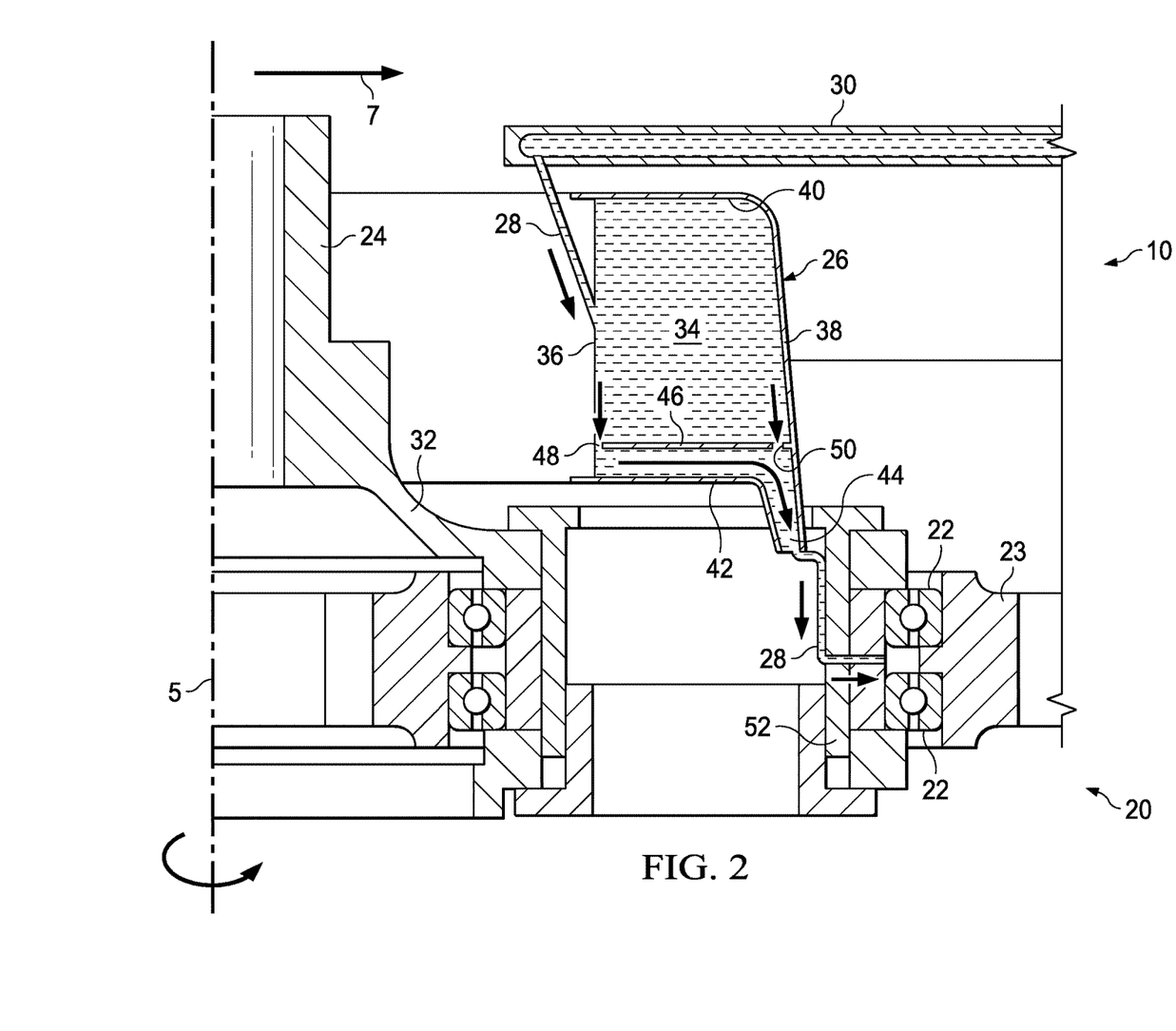
FIG. 2 is a schematic view of an exemplary passive oil system for planetary bearings.
Figure 3:
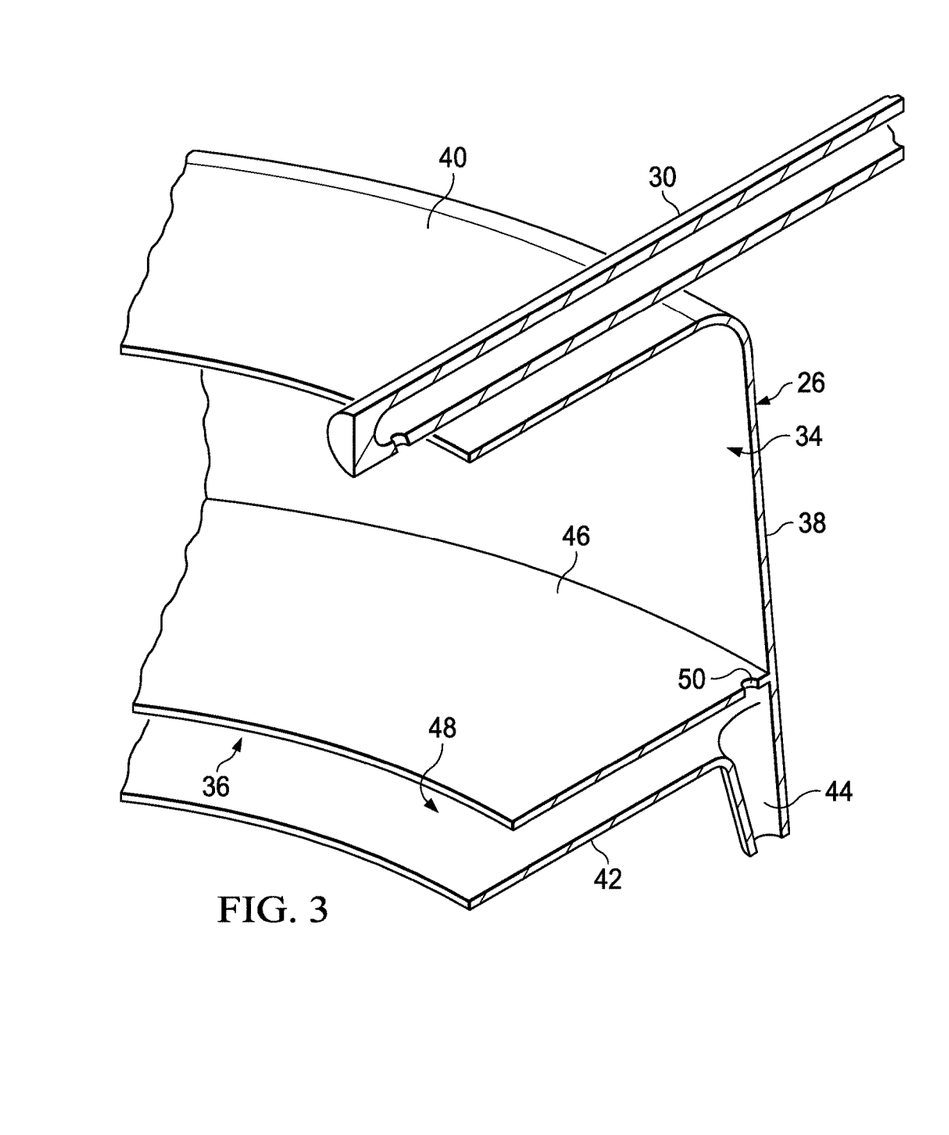
FIG. 3 illustrates a portion of an exemplary reservoir housing of a passive oil system.

FIG. 2 is a schematic illustration of an exemplary embodiment of a passive oil system 10 in conjunction with a gearbox 20 to provide lubrication (e.g., oil) to a gearbox component 22 during a loss of lubrication event. In this example, the component 22 is a planetary bearing shown between a planetary post 52 and planetary gear 23. In the illustrated embodiment, gearbox 20 is depicted as a gearbox on rotorcraft; however, it will be appreciated by those with benefit of this disclosure that the passive oil system 10 may be implemented on a variety of structures having gearboxes that require lubrication. Gearbox 20 functions to convert, for example, high-speed rotation of an output shaft of an engine into a low speed rotation of a rotor shaft 24.

Passive oil system 10 includes a reservoir housing 26 for capturing lubrication fluid 28, e.g., oil, which is provided during normal operating conditions through a lubrication fluid supply line 30. Reservoir housing 26 is for example a cast or machined structural member that during operation rotates about the rotational axis 5 of the rotor shaft 24. For example, in the illustrated examples the reservoir housing 26 is connected to or formed with a planetary carrier 32.

In accordance with some embodiments, the reservoir housing 26 defines a reservoir 34 that may be fully or partially open on the innermost longitudinal side 36, relative to the rotational axis 5. Innermost side 36 is located adjacent the rotational axis 5 relative to the direction of the centrifugal force 7 and extends generally parallel to the rotational axis 5. The reservoir housing 26 generally defines the reservoir 34 between the innermost side 36, an outer sidewall 38, and top and bottom walls 40, 42. The top and bottom walls extend generally perpendicular to the rotational axis 5 and the innermost side and the outer sidewall extend generally parallel to the rotational axis 5.

Figure 8:
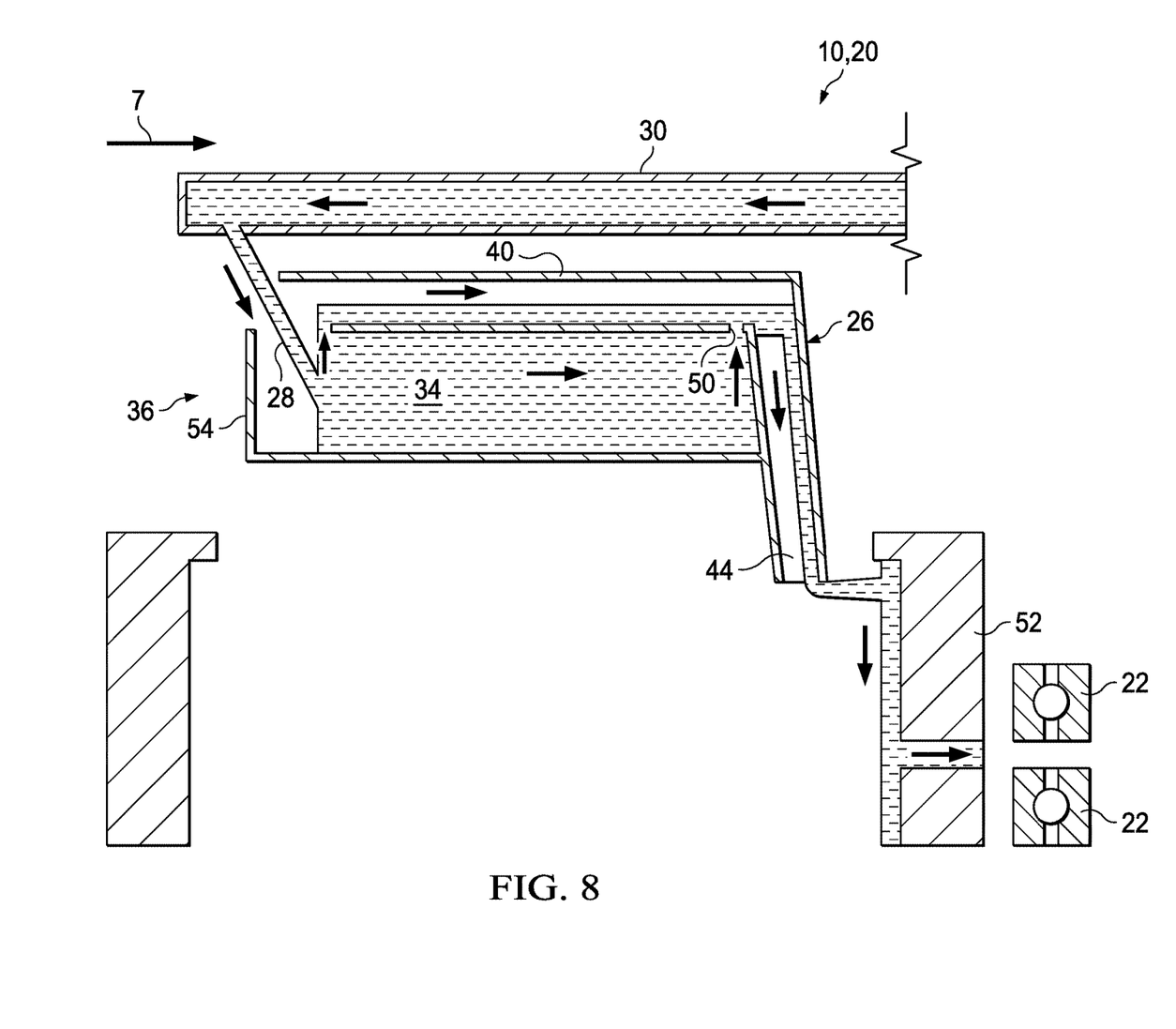
FIGS. 8, 9 and 10 illustrate another exemplary passive oil system.
Figure 9:
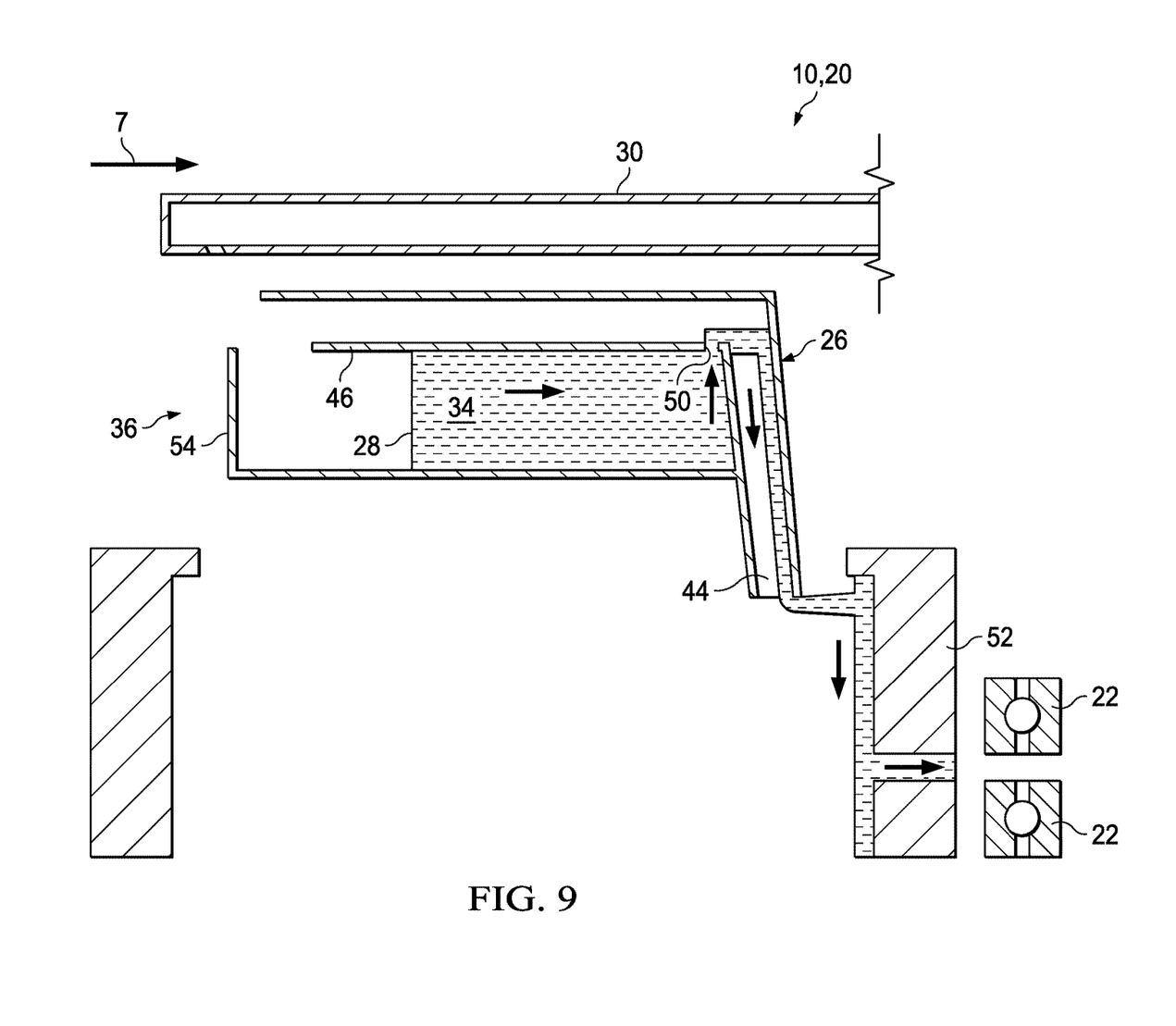
Figure 10:
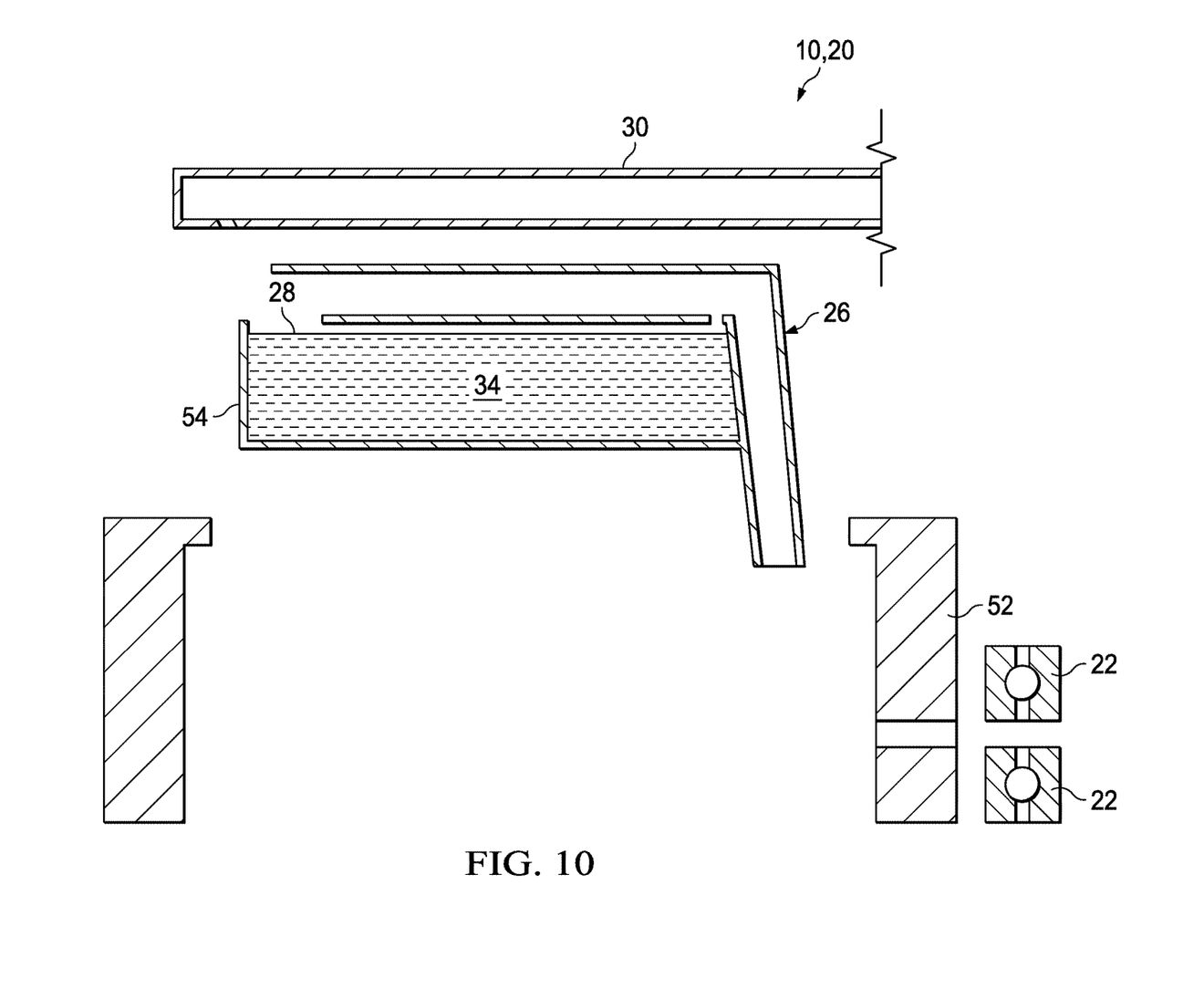

The innermost side 36 of the reservoir 34 and the reservoir housing 26 is fully open in the exemplary embodiments illustrated in FIGS. 1-7 and 11-12, such that when the carrier 32 and reservoir housing 26 cease rotating the lubrication fluid 28 flows out of the reservoir housing 26 through the open innermost side 36. In some embodiments, the innermost side 36 is at least partially closed by a wall such as illustrated in the embodiments of FIGS. 8-10. The reservoir housing 26 has an outlet 44 directing the lubrication fluid 28 from the reservoir 34 to the gearbox component 22. The outlet 44 is positioned adjacent to the outer sidewall 38 so that the centrifugal force directs the lubrication fluid 28 out of the reservoir 34 through the outlet 44. The lubrication fluid 28 is accumulated in the reservoir 34 during startup and/or during normal operations so that the accumulated lubrication fluid 28 can be metered to the gearbox component 22 during a loss of lubrication event.

In accordance to some embodiments the passive oil system 10 is configured to provide lubrication fluid 28 to the gearbox component or components 22 during normal operations, when pressurized lubrication is being provided through the fluid supply line, and during a loss of lubrication event, when pressurized lubrication fluid 28 is not being supplied via the fluid supply line or when low pressure or a low volume lubrication fluid 28 is available from the fluid supply line. For example, with reference in particular to FIGS. 2-10, a spillway wall 46 is located inside the reservoir housing 26 separating the reservoir 34 from the outlet 44. In the illustrated examples, the spillway wall 46 extends from the outer sidewall 38 toward the innermost side 36 and has a spillway opening 48 located adjacent the innermost side 36. As illustrated for example in FIG. 4, when the reservoir 34 is filled with the lubrication fluid 28, the lubrication fluid 28 flows through the spillway opening 48 and around the spillway wall 46 to the outlet 44. The spillway opening 48 may be formed for example by a hole through the spillway wall 46 or at a terminal end of the spillway wall 46. Additionally, the spillway wall 46 includes an orifice 50 that is located adjacent the outer sidewall 38 and provides fluid communication between the reservoir 34 and the outlet 44. In a loss of lubrication event the lubrication fluid 28 volume in the reservoir 34 will diminish and cease passing through the spillway opening 48 but will continue to pass to the outlet 44 through the orifice 50. The orifice 50 may be metered to provide a lower flow rate of the lubrication fluid 28 to the outlet 44 than would be provided during normal operation through the spillway opening to extend the run dry time. In other words, the spillway opening 48 permits a greater flow rate than the orifice 50 of the lubrication fluid 28 from the reservoir 34 to the outlet 44.

Figure 4:
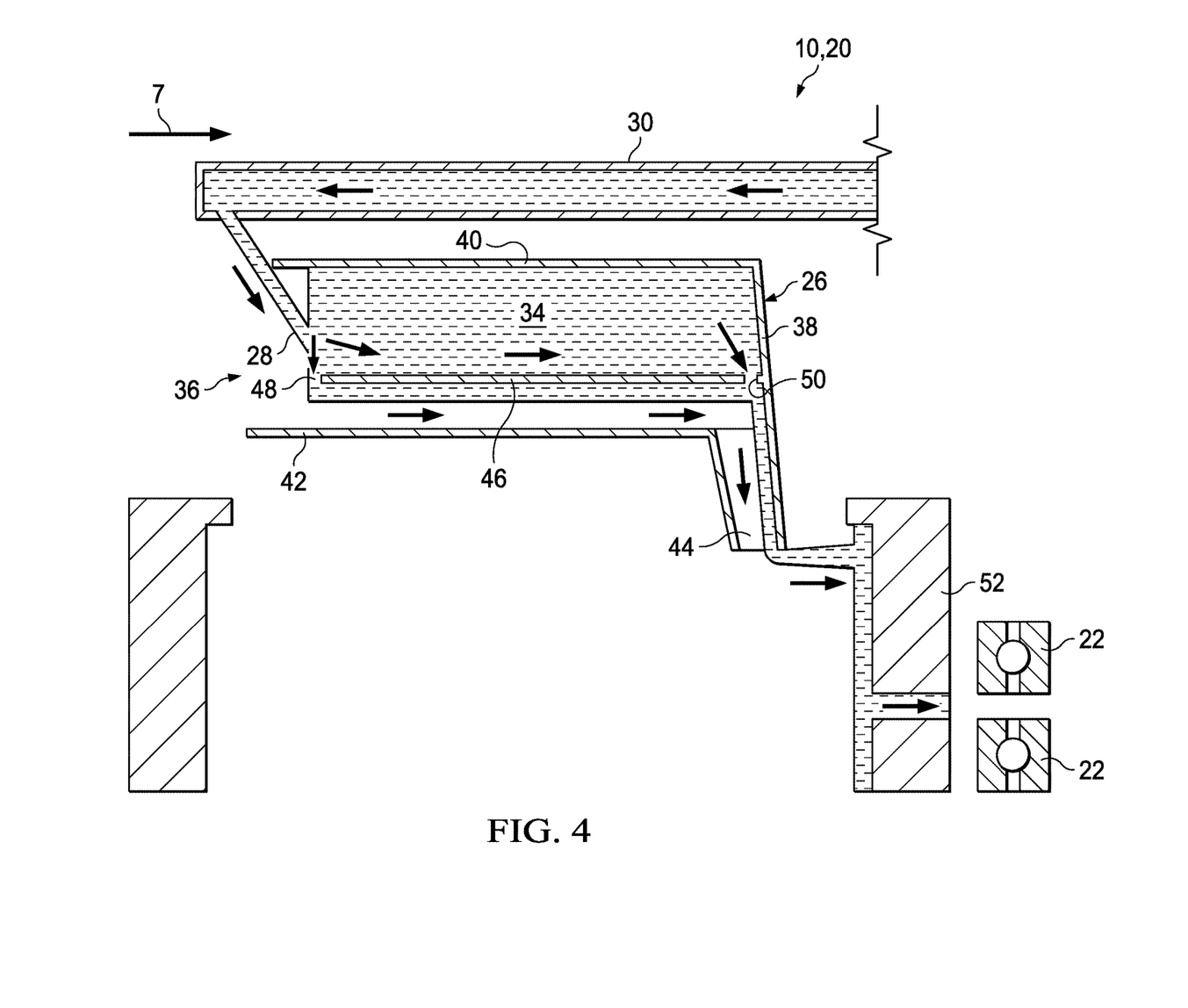
FIGS. 4 and 5 illustrate an exemplary passive oil system respectively in normal operation and operating in a loss of lubrication event.
Figure 5:
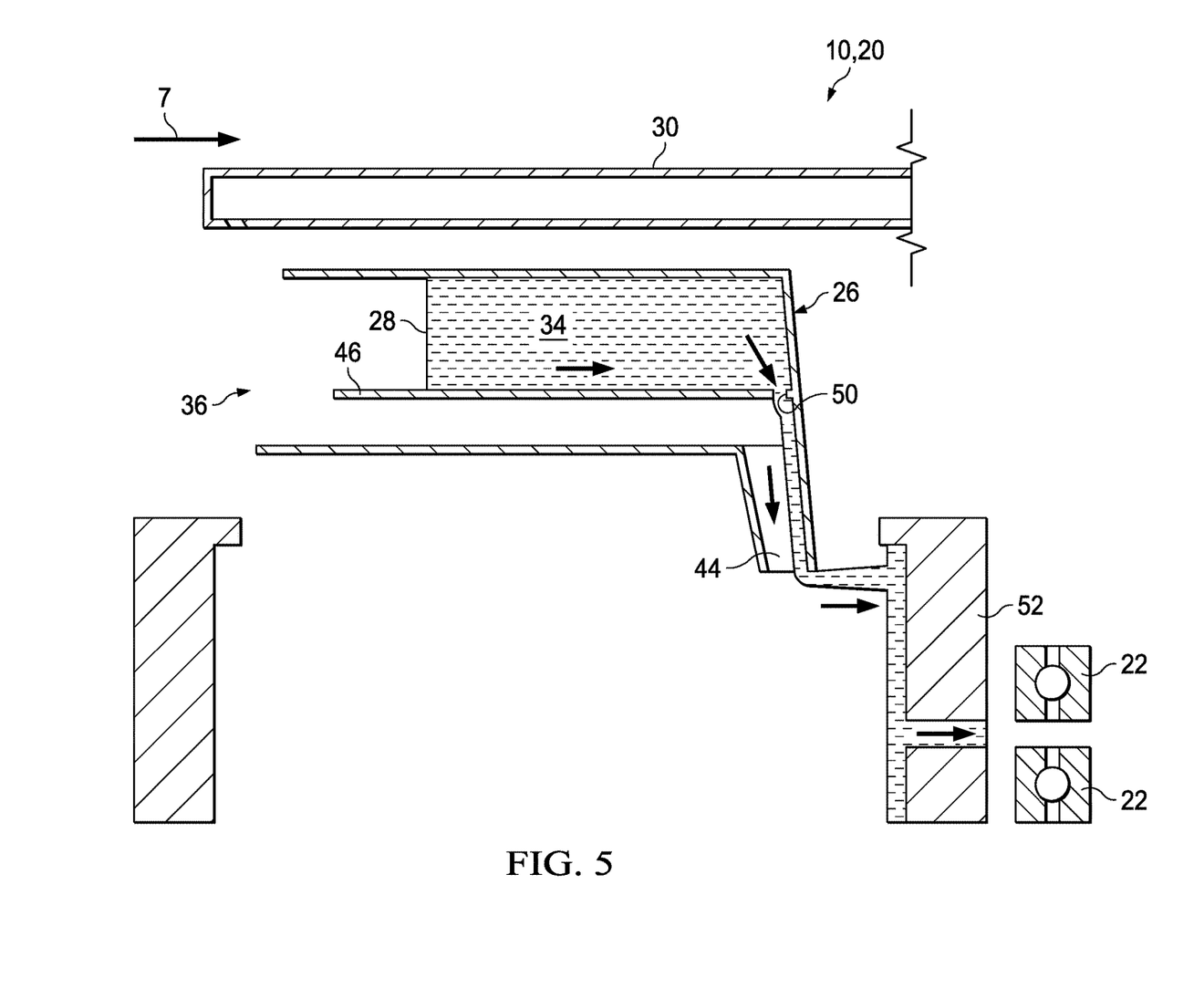

Operation of a passive oil system is now described with reference in particular to FIGS. 1, 4 and 5. In FIGS. 1, 4 and 5 the lubrication fluid 28 is being provided from the reservoir 34 through outlet 44 and into a planetary post 52 and to gearbox components 22, e.g., planetary bearings. During normal operation, as shown in FIG. 4, the lubrication fluid 28 is provided through fluid pressure supply line 30 into reservoir 34. Fluid pressure supply line 30 may be stationary relative to the gearbox 20 while reservoir housing 26 rotates about the gearbox rotational axis 5. In FIG. 4, the lubrication fluid 28 has filled reservoir 34 and is flowing around the spillway wall 46, through spillway opening 48, to the outlet 44. In a loss of lubrication event, as shown in FIG. 5, the lubrication fluid 28 accumulated in reservoir 34 is metered through orifice 50 to the outlet 44 and the gearbox components 22.

Figure 6:
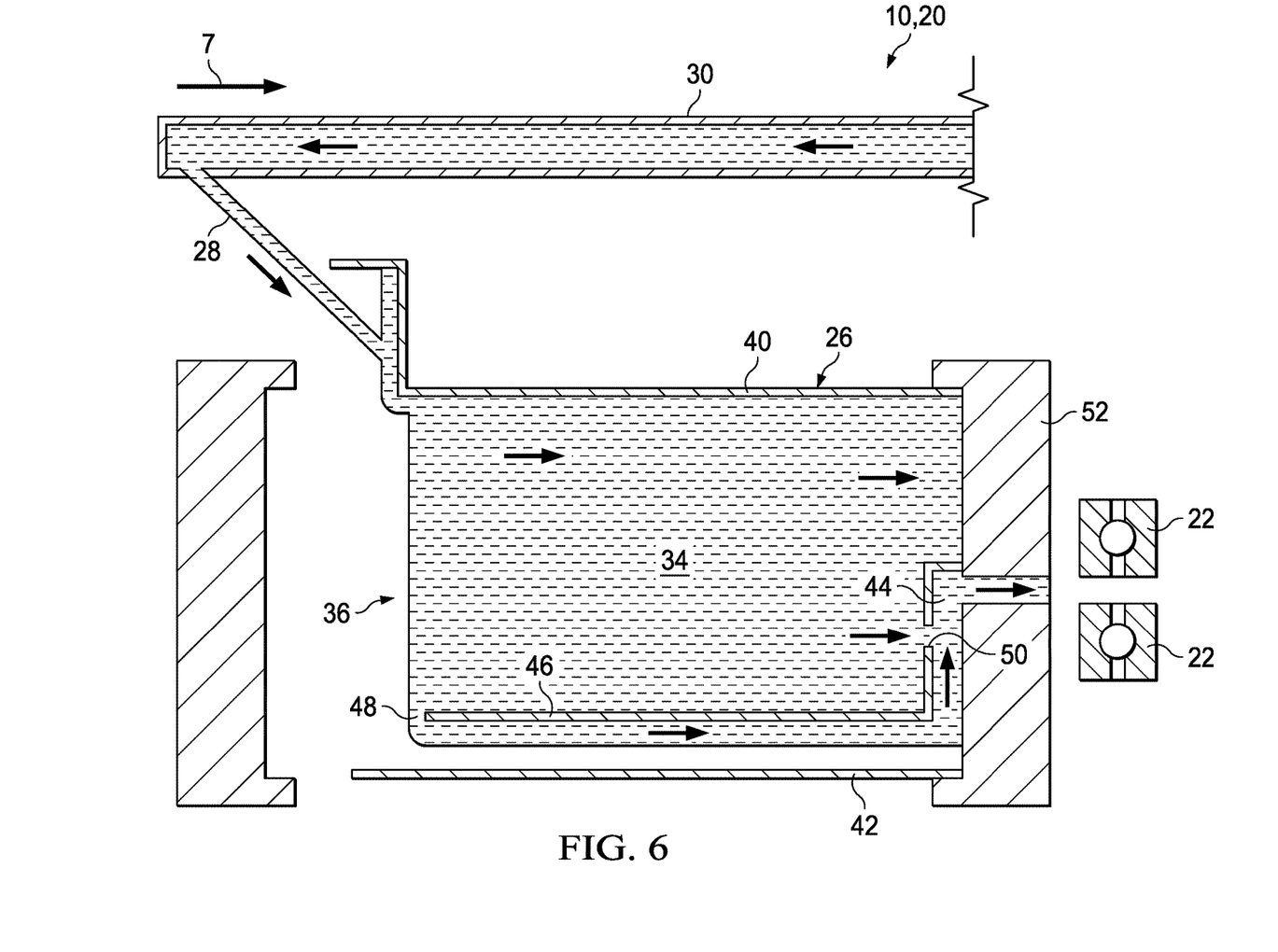
FIGS. 6 and 7 illustrate another exemplary passive oil system respectively in normal operation and operating in a loss of lubrication event.
Figure 7:
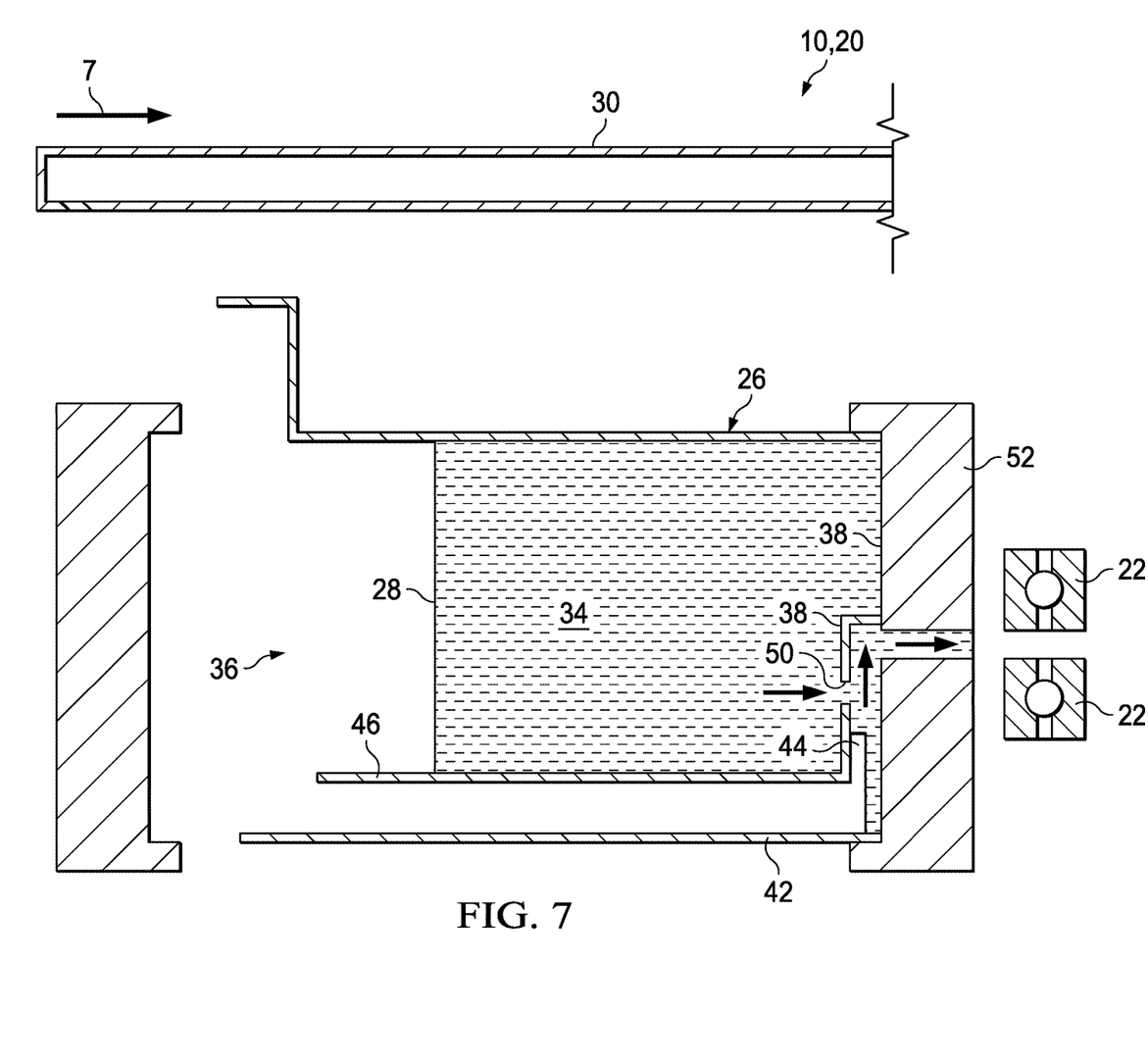

FIGS. 6 and 7 illustrate an exemplary embodiment of the passive oil system 10 in which the reservoir housing 26 is positioned in a planetary post 52. In the illustrated example, portions of the reservoir housing 26 may be formed by the planetary post 52. During normal operation, as shown in FIG. 6, the lubrication fluid 28 is provided through fluid pressure supply line 30 into reservoir 34. In FIG. 6, the lubrication fluid 28 has filled reservoir 34 and is flowing around the spillway wall 46, through spillway opening 48, to the outlet 44. In a loss of lubrication event, as shown in FIG. 7, the lubrication fluid 28 accumulated in reservoir 34 is metered through orifice 50 to the outlet 44 and the gearbox components 22.

FIGS. 8-10 illustrate an example of a passive oil system 10 that minimizes latency to fill the reservoir 34 with lubrication fluid 28. In this embodiment, an inner sidewall 54 is positioned to enclose at least a portion of the reservoir 34 along the innermost side 36. When the reservoir housing 26 is not spinning, as illustrated in FIG. 10, the lubrication fluid 28 is contained within the reservoir 34 and is available for lubrication upon system start-up as illustrated in FIG. 8. During normal operation, as shown in FIG. 8, the lubrication fluid 28 is provided through fluid pressure supply line 30 into reservoir 34. In FIG. 8 the reservoir, 34 may contain lubrication fluid 28 prior to system start-up. When the lubrication fluid 28 fills the reservoir 34 it flows around the spillway wall 46 via spillway opening 48 to the outlet 44. In a loss of lubrication event, as shown in FIG. 9, the lubrication fluid 28 accumulated in reservoir 34 is metered through orifice 50 to the outlet 44 and the gearbox components 22.

Figure 11:
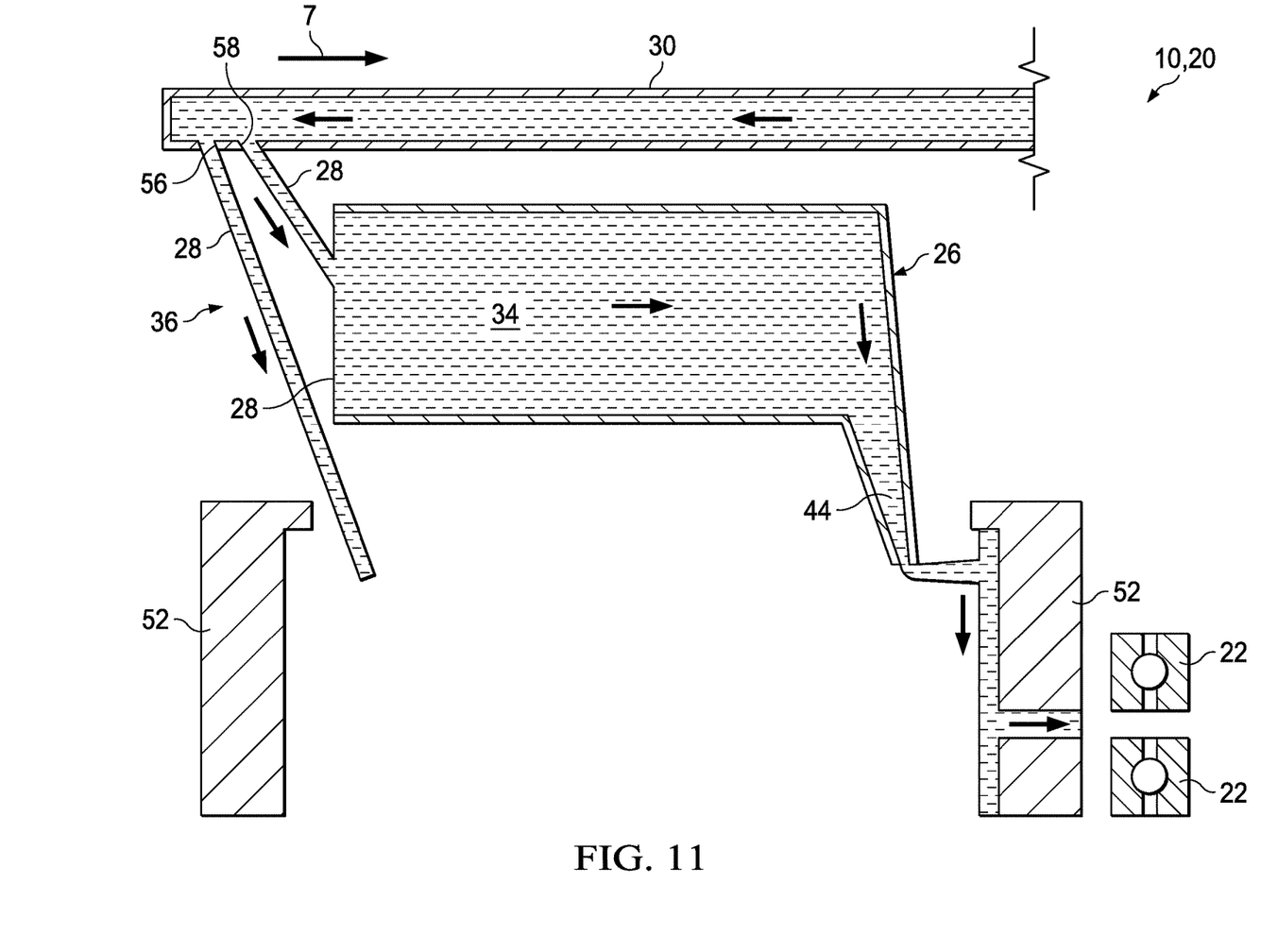
FIGS. 11 and 12 illustrate another exemplary passive oil system respectively in normal operation and operating in a loss of lubrication event.
Figure 12:
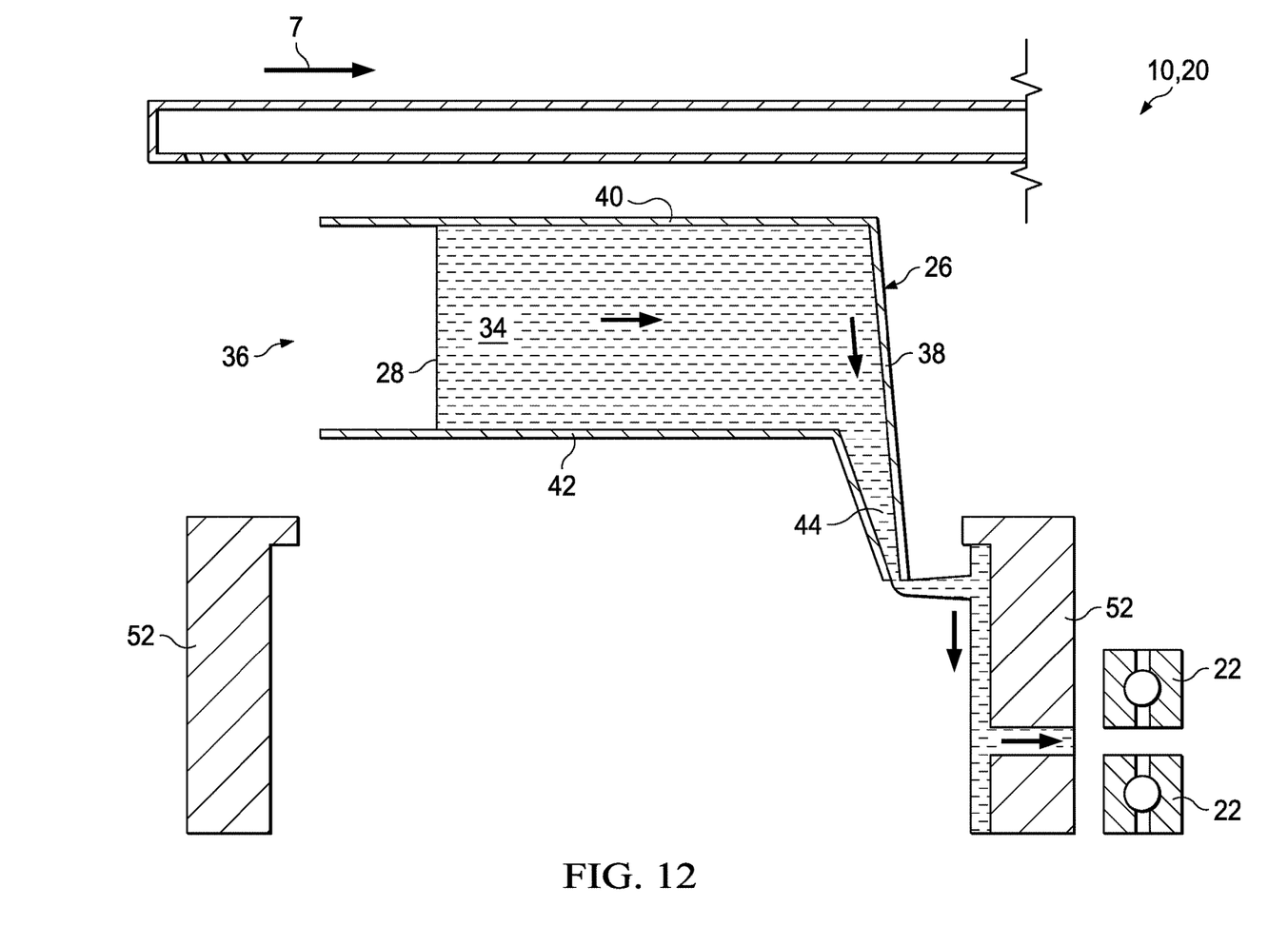

FIGS. 11 and 12 illustrate an exemplary passive oil system that is configured for utilizing as a loss of lubrication system and may be utilized separate from a primary oil system. In FIG. 11, the fluid supply line 30 is providing, during normal operations, lubrication fluid 28 directly to the gearbox components 22 through a first jet 56 and lubrication fluid 28 to reservoir 34 through a second jet 58. The reservoir housing 26 does not include an internal spillway wall and the lubrication fluid 28 is continuously fed to the gearbox components 22 through the outlet 44. In the illustrative embodiment, the outlet 44 is sized to meter the lubrication fluid 28 from the reservoir 34 at a flow rate to achieve the desired run dry capability in a loss of lubrication event as illustrated in FIG. 12.

An exemplary method 100 (FIG. 13) of lubricating a component is now described with reference to FIGS. 1-13. At block 110, a reservoir housing 26 is rotated around a rotational axis 5, the reservoir housing 26 defining a reservoir 34 between a top wall 40, a bottom wall 42, innermost side 36, and an outer sidewall 38. During normal operation, block 120, a lubrication fluid 28 is supplied from a lubrication supply line 30 to the reservoir 34. At block, 130 the lubrication fluid 28 in the reservoir 34 is discharged through an outlet 44, positioned adjacent the outer sidewall, to a gearbox component 22. The lubrication fluid 28 is discharged through the outlet 44 in response to rotating the reservoir housing 26 around the rotational axis 5.

Figure 13:
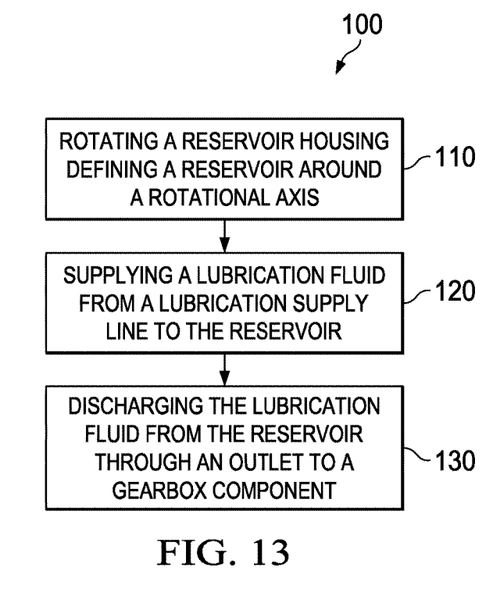
FIG. 13 illustrates an exemplary method of lubricating a gearbox component.

In an exemplary embodiment the reservoir housing 26 includes a spillway wall 46 located in the reservoir housing 26 and separating the reservoir 34 from the outlet 44, a spillway opening 48 adjacent the innermost side 36 providing fluid communication between the reservoir 34 and the outlet 44, and an orifice 50 adjacent the outer sidewall 38 providing fluid communication between the reservoir 34 and the outlet 44. During normal operations, the lubrication fluid 28 may flow from the reservoir 34 to the outlet 44 through both the spillway opening 48 and the orifice 50. During a loss of lubrication event, the lubrication fluid 28 will flow through the orifice 50 to the outlet 44. The orifice 50 may be sized to provide a lower flow rate than through the spillway opening 48. The flow rate permitted through the orifice 50 may be equal to or greater than the flow rate through the spillway opening without departing from the scope of this disclosure.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A passive oil system, comprising:
   a reservoir housing configured in operation to rotate around a rotational axis, the reservoir housing defining a reservoir between a top wall, a bottom wall, innermost side, and an outer sidewall;
   an outlet positioned adjacent the outer sidewall to discharge a lubrication fluid contained in the reservoir in response to the reservoir housing rotating around the rotational axis;
   a spillway wall located in the reservoir housing and separating the reservoir from the outlet;
   a spillway opening adjacent the innermost side providing fluid communication between the reservoir and the outlet; and
   an orifice adjacent the outer sidewall providing fluid communication between the reservoir and the outlet.

2. The passive oil system of claim 1, wherein the innermost side is fully open between the top wall and the bottom wall.

3. The passive oil system of claim 1, wherein the spillway opening permits a greater flow rate than the orifice of the lubrication fluid from the reservoir to the outlet.

4. The passive oil system of claim 1, wherein the innermost side is fully open between the top wall and the bottom wall.

5. The passive oil system of claim 1, wherein the reservoir is partially enclosed on the innermost side by a wall.

6. A gearbox, comprising:
   a planetary carrier configured in operation to rotate a rotor shaft around a rotational axis;
   a reservoir housing configured in operation to rotate around the rotational axis, the reservoir housing defining a reservoir between a top wall, a bottom wall, innermost side, and an outer sidewall, wherein the innermost side is generally parallel to the rotational axis and located between the rotational axis and the outer sidewall;
   an outlet positioned adjacent the outer sidewall to discharge a lubrication fluid contained in the reservoir to a planetary bearing in response to rotation of the reservoir housing around the rotational axis;

a spillway wall located in the reservoir housing and separating the reservoir from the outlet;

a spillway opening adjacent the innermost side providing fluid communication between the reservoir and the outlet; and an orifice adjacent the outer sidewall providing fluid communication between the reservoir and the outlet.

7. The gearbox of claim 6, wherein the spillway opening permits a greater flow rate than the orifice of the lubrication fluid from the reservoir to the outlet.

8. The gearbox of claim 6, wherein the innermost side is fully open between the top wall and the bottom wall.

9. The gearbox of claim 6, wherein the reservoir is partially enclosed on the innermost side by a wall.

10. The gearbox of claim 6, wherein the innermost side is fully open between the top wall and the bottom wall; and the spillway opening permits a greater flow rate than the orifice of the lubrication fluid from the reservoir to the outlet.

\* \* \* \* \*